US008293406B2

(12) United States Patent
Ogasawara et al.

(10) Patent No.: US 8,293,406 B2
(45) Date of Patent: *Oct. 23, 2012

(54) POSITIVE ELECTRODE ACTIVE MATERIAL FOR NON-AQUEOUS ELECTROLYTE SECONDARY BATTERY, PROCESS FOR PREPARING THE SAME, AND POSITIVE ELECTRODE FOR NON-AQUEOUS ELECTROLYTE SECONDARY BATTERY AND NON-AQUEOUS ELECTROLYTE SECONDARY BATTERY

(75) Inventors: Takeshi Ogasawara, Moriguchi (JP); Naoki Imachi, Moriguch (JP); Yasunori Baba, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 978 days.

This patent is subject to a terminal disclaimer.

(21) Appl. No.: 12/235,922

(22) Filed: Sep. 23, 2008

(65) Prior Publication Data

US 2009/0081546 A1    Mar. 26, 2009

(30) Foreign Application Priority Data

Sep. 26, 2007    (JP) ................................. 2007-248650
Mar. 14, 2008    (JP) ................................. 2008-66191
Jun. 30, 2008    (JP) ................................. 2008-169787

(51) Int. Cl.
*H01M 4/48*    (2010.01)
*H01M 4/58*    (2010.01)
*B05D 5/12*    (2006.01)

(52) U.S. Cl. .............. 429/218.1; 429/231.95; 427/126.4
(58) Field of Classification Search ............... 429/218.1, 429/231.95; 427/126.4
See application file for complete search history.

(56) References Cited

U.S. PATENT DOCUMENTS

| | | | |
|---|---|---|---|
| 6,372,385 B1 | 4/2002 | Kweon et al. | |
| 6,395,426 B1 * | 5/2002 | Imachi et al. | 429/231.3 |
| 6,521,377 B2 * | 2/2003 | Ogasawara et al. | 429/218.1 |
| 6,653,021 B2 * | 11/2003 | Kweon et al. | 429/231.1 |
| 6,835,497 B2 * | 12/2004 | Ogasawara et al. | 429/223 |
| 6,974,486 B1 * | 12/2005 | Kweon et al. | 429/231.1 |
| 6,974,601 B2 * | 12/2005 | Kweon et al. | 427/115 |
| 7,138,209 B2 * | 11/2006 | Kweon et al. | 429/231.1 |
| 7,316,865 B2 * | 1/2008 | Kweon et al. | 429/218.1 |
| 7,666,551 B2 * | 2/2010 | Kogetsu et al. | 429/231.95 |
| 8,007,941 B2 * | 8/2011 | Kweon et al. | 429/231.1 |
| 2008/0063941 A1 * | 3/2008 | Itaya et al. | 429/231.95 |
| 2008/0118833 A1 | 5/2008 | Ueda et al. | |
| 2009/0087731 A1 * | 4/2009 | Fukui et al. | 429/164 |

FOREIGN PATENT DOCUMENTS

| | | |
|---|---|---|
| JP | 11317230 A | 11/1999 |
| JP | 2006173099 A | 6/2006 |
| WO | WO 2006/054604 A1 * | 5/2006 |

* cited by examiner

*Primary Examiner* — Helene Klemanski
(74) *Attorney, Agent, or Firm* — Westerman, Hattori, Daniels & Adrian, LLP

(57) ABSTRACT

A non-aqueous electrolyte secondary battery includes a positive electrode, a negative electrode, and a non-aqueous electrolyte. The positive electrode employs a positive electrode active material wherein oxide containing Al and/or hydroxide containing Al having a protruding-shape is uniformly distributed and adhered to the surface of a positive electrode active material particle.

14 Claims, 3 Drawing Sheets

(A)

(B)

POSITIVE ELECTRODE ACTIVE MATERIAL FOR NON-AQUEOUS ELECTROLYTE SECONDARY BATTERY, PROCESS FOR PREPARING THE SAME, AND POSITIVE ELECTRODE FOR NON-AQUEOUS ELECTROLYTE SECONDARY BATTERY AND NON-AQUEOUS ELECTROLYTE SECONDARY BATTERY

RELATED APPLICATIONS

This application claims priority from Japanese Patent Application Nos. 2007-248650, 2008-66191, and 2008-169787, which are hereby incorporated by reference.

BACKGROUND OF THE INVENTION

1. Field of the Invention

The present invention relates to a positive electrode active material of a positive electrode for non-aqueous electrolyte secondary battery, process for preparing the same, and a positive electrode for non-aqueous electrolyte secondary battery using such a positive electrode active material for non-aqueous electrolyte secondary battery and a non-aqueous electrolyte secondary battery. More particularly, a feature of the invention is an improvement in a positive electrode active material of a positive electrode for a non-aqueous electrolyte secondary battery in a non-aqueous electrolyte secondary battery for the purpose of improving charge/discharge cycle performances at high voltage and enhancing charge/discharge efficiency after preservation at high temperature.

2. Description of the Related Art

In recent years, mobile information terminal such as mobile phone, note personal computer and PDA has been rapidly developed to be more compact as well as lighter in weight. As a result, demands for higher capacity in a battery as a driving power source used for such a mobile information terminal have been increasing.

In order to meet such a demand, in recent years, as one type of new secondary batteries featuring high powers and high energy densities, a non-aqueous electrolyte secondary battery is in wide use, which employs a non-aqueous electrolyte and which is adapted for charging/discharging by way of transfer of lithium ions between a positive electrode and a negative electrode.

Generally, the positive electrode active material used for the positive electrode of such a non-aqueous electrolyte secondary battery is lithium cobalt oxide $LiCoO_2$, lithium manganese oxide $LiMn_2O_4$ having a spinel structure, lithium composite oxide of cobalt-nickel-manganese, lithium composite oxide of aluminum-nickel-manganese, lithium composite oxide of aluminum-nickel-cobalt, and the like. The negative electrode active material of the negative electrode used includes carbon materials such as graphite, materials to be alloyed with lithium such as Si and Sn, and the like.

In recent years, because of advancement of amusement function such as moving image reproduction and game function by mobile information terminal, electric power consumption tends to rise steadily. As a result, demands for further higher capacity in a battery have been increasing.

In order to increase capacity further, it is thought to raise charging termination voltage.

For example, a non-aqueous electrolyte secondary battery which uses lithium cobalt oxide having high capacity is generally charged until voltage becomes about 4.3 V with respect to lithium metal, which means the capacity of lithium cobalt oxide is utilized only at about 160 mAh/g, although theoretical capacity of lithium cobalt oxide is about 273 mAh/g.

On the other hand, when the non-aqueous electrolyte secondary battery which uses lithium cobalt oxide having high capacity is charged until voltage becomes 4.5 V with respect to lithium metal, lithium cobalt oxide is utilized to the degree of about 180 mAh/g and a non-aqueous electrolyte secondary battery with higher capacity can be obtained.

However, if charging voltage of the non-aqueous electrolyte secondary battery is raised as described above, oxidizing force of the positive electrode active material such as lithium cobalt oxide becomes strong. As a result, speed of decomposition of the non-aqueous electrolyte is accelerated, stability of crystal structure of the positive electrode active material in which lithium is removed is deteriorated, and elements such as cobalt are eluted from the positive electrode active material.

Then, decomposition products of the non-aqueous electrolyte and the elements such as cobalt eluted from the positive electrode active material are moved to the negative electrode, forming a film on the surface of the negative electrode. By such a condition, charging-acceptance of the negative electrode is lowered and lithium metal is deposited on the surface of the negative electrode. As a result, cycle characteristics and preservation characteristics of the non-aqueous electrolyte secondary battery are greatly deteriorated. Especially, under the strict circumstances of leaving the non-aqueous electrolyte secondary battery as it is at high temperature of 50° C. or more, the non-aqueous electrolyte secondary battery is greatly deteriorated.

In recent years, in order to prevent elements such as cobalt from eluting from the positive electrode active material, it has been proposed to use a positive electrode active material produced by coating the surface thereof with metal oxide such as Mg and Al by sol-gel method using metal alkoxide such as Mg and Al. (See, for example, Patent Document 1, Japanese Published Unexamined Patent Application No. 11-317230.) Further, it has been proposed to use a positive electrode active material particle produced by coating the surface thereof with metal such as Mg and Al by mechanical method using ball mill or the like. (See, for example, Patent Document 2, Japanese Published Unexamined Patent Application No. 2006-173099).

However, as suggested in Patent Document 1, since metal alkoxide, such as Mg and Al, is expensive, the method using such metal alkoxide leads to a problem of cost increase.

Further, unfortunately, in both methods suggested in these Patent Documents, it has been difficult that metal alkoxide such as Mg and Al is adhered being uniformly distributed on the surface of the positive electrode active material. As a result, in the case of raising the charging voltage, there still remains a problem of deterioration in cycle characteristics and preservation characteristics of the non-aqueous electrolyte secondary battery which is resulting from decomposition of the non-aqueous electrolyte and the elution of elements such as cobalt from the positive electrode active material.

SUMMARY OF THE INVENTION

The invention is directed to a solution to the above problems associated with the non-aqueous electrolyte secondary battery.

That is, an object of the invention is to improve a positive electrode active material of a positive electrode for a non-aqueous electrolyte secondary battery, thereby improving charge/discharge cycle performances at high voltage and enhancing charge/discharge efficiency after preservation at high temperature.

According to this invention, in a positive electrode active material for non-aqueous electrolyte secondary battery, oxide containing Al and/or hydroxide containing Al, which is protruding-shape, is uniformly distributed and adhered to the surface of a positive electrode active material particle.

The above-mentioned oxide containing Al and/or hydroxide containing Al having the protruding-shape is generally formed in fibrous and/or flat plate.

In the positive electrode active material for non-aqueous electrolyte secondary battery, if the amount of the oxide containing Al and/or hydroxide containing Al having the protruding-shape adhering to the surface of the positive electrode active material particle is small, sufficient effects, such as, suppression of decomposition of the non-aqueous electrolyte, and restriction of elution of the elements such as cobalt from the positive electrode active material, are hard to be attained. For this reason, it is preferable that the adherent amount of oxide containing Al and/or hydroxide containing Al having the protruding-shape with respect to the positive electrode active material particle be 0.03 mass % or more. On the other hand, if the amount of oxide containing Al and/or hydroxide containing Al of the protruding-shape adhering to the surface of the positive electrode active material particle is too large, the proportion of the positive electrode active material contributing to charging and discharging is reduced, leading to a decrease in capacity of the non-aqueous electrolyte secondary battery. For this reason, it is preferable that the adherent amount of oxide containing Al and/or hydroxide containing Al having the protruding-shape with respect to the positive electrode active material particle be 3 mass % or less.

If the proportion of oxide containing Al and/or hydroxide containing Al having the protruding-shape adhering to the surface of the positive electrode active material particle is increased, there is a risk of expansion of the non-aqueous electrolyte secondary battery caused by a gas generated from a reaction between hydroxide containing Al and the non-aqueous electrolyte, in the case of the preservation of the non-aqueous electrolyte secondary battery. Therefore, it is preferable that the proportion of only the protruding-shaped oxide containing Al adhering to the surface of the positive electrode active material particle be increased. More preferably, only the protruding-shaped oxide containing Al is adhered.

Further, in addition to oxide containing Al and hydroxide containing Al, phosphoric acid composite is preferably adhered to the surface of the positive electrode active material particle in the positive electrode active material for non-aqueous electrolyte secondary battery. By such ways, phosphoric acid composite adhering to the surface of the positive electrode active material particle contributes to restriction of elution of the positive electrode active material.

Examples of usable phosphoric acid composite include trilithium phosphate, trimagnesium phosphate and magnesium hydrogen phosphate.

As to the amount of phosphoric acid composite adhering to the surface of the positive electrode active material particle, if the amount is small, the sufficient effect of restricting the elution of the positive electrode active material is hard to be attained. On the other hand, if the amount is too large, the proportion of the positive electrode active material is reduced and the capacity of the non-aqueous electrolyte secondary battery is decreased. For these reasons, it is preferable that the adherent amount of phosphoric acid composite with respect to the positive electrode active material particle be within the range of 0.05 to 3 mass %.

Furthermore, in order to suppress reduction of the proportion of the positive electrode active material, it is preferable that the total amount of oxide containing Al, hydroxide containing Al, and phosphoric acid composite adhering to the surface of the positive electrode active material particle be 3 mass % or less.

According to the present invention, a process for preparing the positive electrode active material for the non-aqueous electrolyte secondary battery comprises the steps of depositing hydroxide containing Al on the surface of the positive electrode active material particle in an aqueous solution dissolving Al salt and heat-treating the positive electrode active material particle on which hydroxide containing Al is deposited.

In the case of deposition of hydroxide containing Al on the surface of the positive electrode active material particle in the aqueous solution dissolving Al salt, the pH of the aqueous solution dissolving Al salt is preferably adjusted to be within the range of 7 to 11. If the pH of the aqueous solution dissolving Al salt is less than 7, there is a risk that apart of the aqueous solution dissolving Al salt reacts with lithium in the positive electrode active material. On the other hand, if the pH of the aqueous solution dissolving Al salt is more than 11, hydroxide containing Al is dissolved and is hard to be appropriately deposited on the surface of the positive electrode active material particle. Particularly, in order to attain more uniform deposition of finer hydroxide containing Al on the surface of the positive electrode active material particle, it is preferable that the pH of the aqueous solution dissolving Al salt be within the range of 7 to 10, and more preferably be within the range of 7 to 9.

In the case that heat-treatment is conducted on the positive electrode active material particle on which surface hydroxide containing Al is deposited, when the temperature of heat-treatment is low, the hydroxide containing Al deposited on the surface of the positive electrode active material particle is not changed to oxide containing Al, and the gas resulting from reaction of hydroxide containing Al and the non-aqueous electrolyte is generated, leading to a risk of expansion of the battery. Therefore, it is preferable that the temperature of heat-treatment be 200° C. or more.

Here, the temperature of heat-treating hydroxide containing Al is increased by 5° C. for 1 minute and a ratio of decrease in mass of hydroxide containing Al in changing to oxide containing Al is examined. According to the results of examination, the mass decrease ratio is 0.1% when the temperature is under 200° C. On the other hand, the mass decrease ratio is 2% at 200° C., 4.5% at 250° C., 26% at 300° C. and 31% at 400° C. As is apparent from the results, in order to change hydroxide containing Al into oxide containing Al on the surface of the positive electrode active material particle, it is preferable that the temperature of heat-treatment be not less than 200° C.

A positive electrode for non-aqueous electrolyte secondary battery according to the invention utilizes the forgoing positive electrode active material for non-aqueous electrolyte secondary battery.

Further, a non-aqueous electrolyte secondary battery according to the invention utilizes a positive electrode that is the foregoing positive electrode for non-aqueous electrolyte secondary battery using the positive electrode active material for non-aqueous electrolyte secondary battery.

The non-aqueous electrolyte secondary battery according to the invention is characterized by the use of oxide containing Al and/or hydroxide containing Al having protruding-shape which are uniformly distributed and adhered to the surface of a positive electrode active material particle. The non-aqueous electrolyte secondary battery of the invention is not particularly limited in the type of positive electrode active material, the type of negative electrode active material for a negative electrode, or the type of non-aqueous electrolyte and hence, may employ any of the known positive electrode active materials, negative electrode active materials for negative electrode and non-aqueous electrolytes commonly used in the art.

Examples of usable positive electrode active material include lithium cobalt oxide $LiCoO_2$, lithium manganate having a spinel structure $LiMn_2O_4$, lithium composite oxide of cobalt-nickel-manganese, lithium composite oxide of aluminum-nickel-manganese, and lithium composite oxide of aluminum-nickel-cobalt.

Examples of usable negative electrode active material for negative electrode include carbon materials such as graphite, and materials alloying with lithium such as Si and Sn. Particularly, the materials alloying with lithium such as Si which have high capacity may be preferably used for the purpose of increasing battery capacity.

In this invention, the non-aqueous electrolyte may be a non-aqueous electrolyte dissolving a solute in a non-aqueous solvent.

Furthermore, in the non-aqueous electrolyte, any non-aqueous solvent that has been conventionally used may be employed as the non-aqueous solvent. Examples of usable non-aqueous solvent include cyclic carbonate, such as ethylene carbonate, propylene carbonate, butylene carbonate and vinylene carbonate, and chained carbonate, such as dimethyl carbonate, methyl ethyl carbonate and diethyl carbonate. Particularly, a mixed solvent of cyclic carbonate and chained carbonate is preferably used.

In the non-aqueous electrolyte, any lithium salt that has conventionally been used may be employed as the solute to be dissolved in the non-aqueous solvent. Examples include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, which may be used either alone or in combination. In addition to these lithium salt, a lithium salt which has oxalate complex as an anion may preferably be contained. Examples of usable lithium salt which has oxalate complex as the anion include lithium-bis (oxalato)borate.

In the non-aqueous electrolyte secondary battery according to this invention, oxide containing Al and/or hydroxide containing Al having the protruding-shape which is uniformly distributed and adhered to the surface of the positive electrode active material particle is used as the positive electrode active material for the positive electrode. As a result, decomposition of the non-aqueous electrolyte and elution of elements such as cobalt from the positive electrode active material are suppressed even in the case that the positive electrode is charged to the high voltage of 4.40 v or more with respect to the lithium metal for the purpose of increasing the battery capacity or in the case of the use at high temperature of 50° C. or more.

As a consequence, with the non-aqueous electrolyte secondary battery of the present invention, charge/discharge cycle performances at high voltage and charge/discharge efficiency after preservation at high temperature are improved, making it possible to attain high capacity.

Particularly, in the case that hydroxide containing Al adhering to the surface of the positive electrode active material particle is changed into oxide containing Al so that only the protruding-shaped oxide containing Al is adhered to the surface of the positive electrode active material particle, the oxide containing Al suppress the gas generation resulting from the reaction between the non-aqueous electrolyte and itself during the preservation of the non-aqueous electrolyte secondary battery and prevents battery expansion.

Further, in addition to oxide containing Al and hydroxide containing Al, in the case that phosphoric acid composite is added and adhered to the surface of the positive electrode active material particle, the elution of the positive electrode active material is suppressed and charge/discharge efficiency after the preservation at high temperature is further enhanced.

Furthermore, according to the present invention, the process for preparing the positive electrode active material comprises the steps of depositing hydroxide containing Al on the surface of the positive electrode active material particle in the aqueous solution dissolving Al salt, and heat-treating the positive electrode active material particle on which surface hydroxide containing Al is deposited. As a result, in the present invention, production cost of the positive electrode active material is reduced as compared with the case of using metal alkoxide. Further, in the present invention, the positive electrode active material used for the non-aqueous electrolyte secondary battery wherein oxide containing Al and/or hydroxide containing Al having the protruding-shape are uniformly distributed and adhered to its surface can be obtained.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

A positive electrode active material for non-aqueous electrolyte secondary battery, a process for preparing the same, and a positive electrode for non-aqueous electrolyte secondary battery and a non-aqueous electrolyte secondary battery according to the invention will hereinbelow be described in detail by way of examples thereof. In addition, it will be demonstrated by the comparison with comparative examples that charge/discharge cycle performances at high voltage and charge/discharge efficiency after preservation at high temperature are improved in the non-aqueous electrolyte secondary battery according to examples of the invention. It is to be noted that the positive electrode active material for non-aqueous electrolyte secondary battery, the process for preparing the same, and the positive electrode for non-aqueous electrolyte secondary battery and the non-aqueous electrolyte secondary battery according to the invention are not limited to the following examples and may be practiced with suitable modifications made thereto so long as such modifications do not deviate from the scope of the invention.

Example 1

In Example 1, a flat-shaped non-aqueous electrolyte secondary battery having a design capacity of 780 mAh in the case of charging up to 4.40 V was fabricated using a positive electrode, a negative electrode, and non-aqueous electrolyte that were prepared in the following method.

Fabrication of Positive Electrode

A positive electrode was prepared as follows. Lithium cobalt oxide wherein each of Al and Mg was solved at a concentration of 1.0 mol % was used. 1000 g of the foregoing lithium cobalt oxide was poured into 5 liter of ion exchange water and was stirred to prepare a mixture. Thereafter, aluminum sulfate aqueous solution dissolving 3.36 g of aluminum sulfate in 100 ml of ion exchange water was added while stirring and sodium hydroxide was appropriately added to adjust the pH of the resultant mixture to be 10.3. Thus, a process of preparing lithium cobalt oxide on which surface aluminum hydroxide was adhered was conducted.

Next, the processed mixture was left as it is for 30 minutes and the supernatant solution thereof was removed, and the objects processed were collected by aspirating and filtering. Then, the processed objects were heat-treated by being dried at 120° C. for 4 hours and then fired at 400° C. under air atmosphere for 5 hours, thereby to change aluminum hydroxide adhering to the surface of the positive electrode active material particle into aluminum oxide. Thus, a positive electrode active material wherein aluminum oxide was adhered to the surface of a positive electrode active material particle of lithium cobalt oxide was obtained. In the positive electrode active material, the adherent amount of aluminum oxide adhering to the surface of the positive electrode active material particle of lithium cobalt oxide with respect to the positive electrode active material particle itself was 1.0 mass %.

Figure 1:
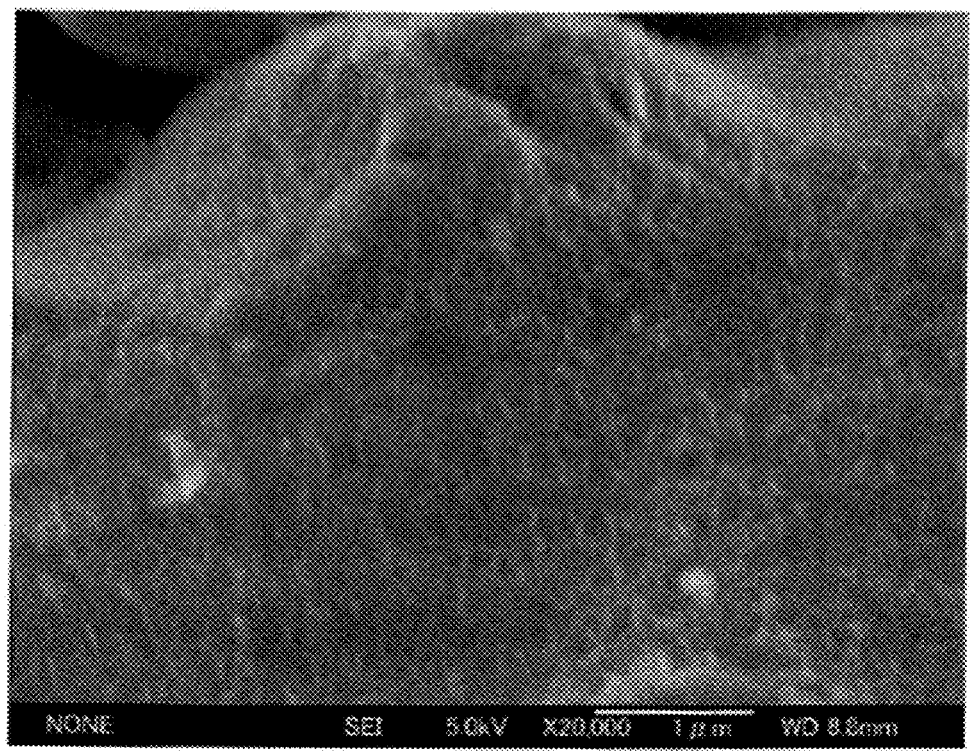
FIG. 1 is a view showing a positive electrode active material prepared in Example 1 observed by SEM.

Here, the positive electrode active material wherein aluminum oxide was adhered to the surface of lithium cobalt oxide was observed by SEM. As shown in FIG. 1, the results of observation show that the protuberances of aluminum oxide formed in fibrous and/or flat plate were uniformly distributed and adhered to the surface of lithium cobalt oxide.

Next, the foregoing positive electrode active material was mixed and stirred with acetylene black as a conductive agent and N-methyl-2-pyrrolidone solution dissolving polyvinylidene fluoride as a binder agent in the mass ratio of 95:2.5:2.5 using a mixing and stirring device (a tradename COMBI MIX made by TOKUSHU KIKA KOGYO KK.). Thus, positive electrode mixture slurry was prepared.

Then, the positive electrode mixture slurry was applied uniformly on both sides of a positive electrode current collector made of aluminum foil, dried and rolled by a roller to prepare a positive electrode wherein a positive electrode mixture layer was formed on both sides of the positive electrode current collector. The filling density of the positive electrode active material in the positive electrode was 3.6 g/cm$^3$.

Fabrication of Negative Electrode

A negative electrode was fabricated as follows. Artificial graphite as a negative electrode active material, CMC, carboxymethyl cellulose sodium and SBR, styrene-butadiene rubber as a binder agent, were mixed together in an aqueous solution in a mass ratio of 98:1:1 to prepare negative electrode mixture slurry.

Then, the negative electrode mixture slurry was applied uniformly on both sides of a negative electrode current collector made of copper foil, dried and rolled by the roller to prepare a negative electrode wherein a negative electrode mixture layer was formed on both sides of the negative electrode current collector. The filling density of the negative electrode active material in the negative electrode was 1.60 g/cm$^3$.

Preparation of Non-Aqueous Electrolyte

A non-aqueous electrolyte was prepared as follows. A non-aqueous solvent mixture was prepared by mixing ethylene carbonate and diethyl carbonate which are non-aqueous solvent in a volume ratio of 3:7. A solute of LiPF$_6$ was dissolved in the resultant solvent mixture in a concentration of 1.0 mol/l thereby to give the non-aqueous electrolyte.

Fabrication of Battery

Figure 2:
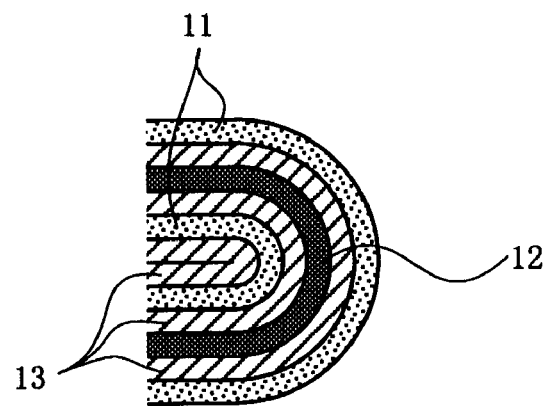
FIG. 2 are a partial schematic sectional view and a schematic perspective view illustrating a flat electrode fabricated in Examples and Comparative Examples.
Figure 2:
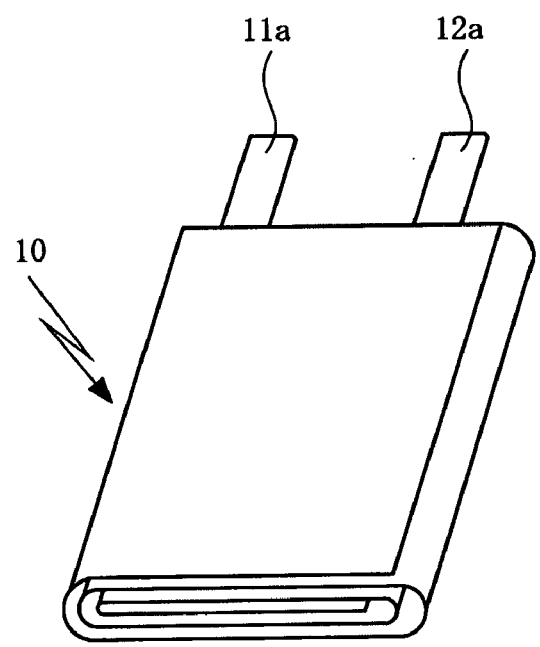
Figure 3:
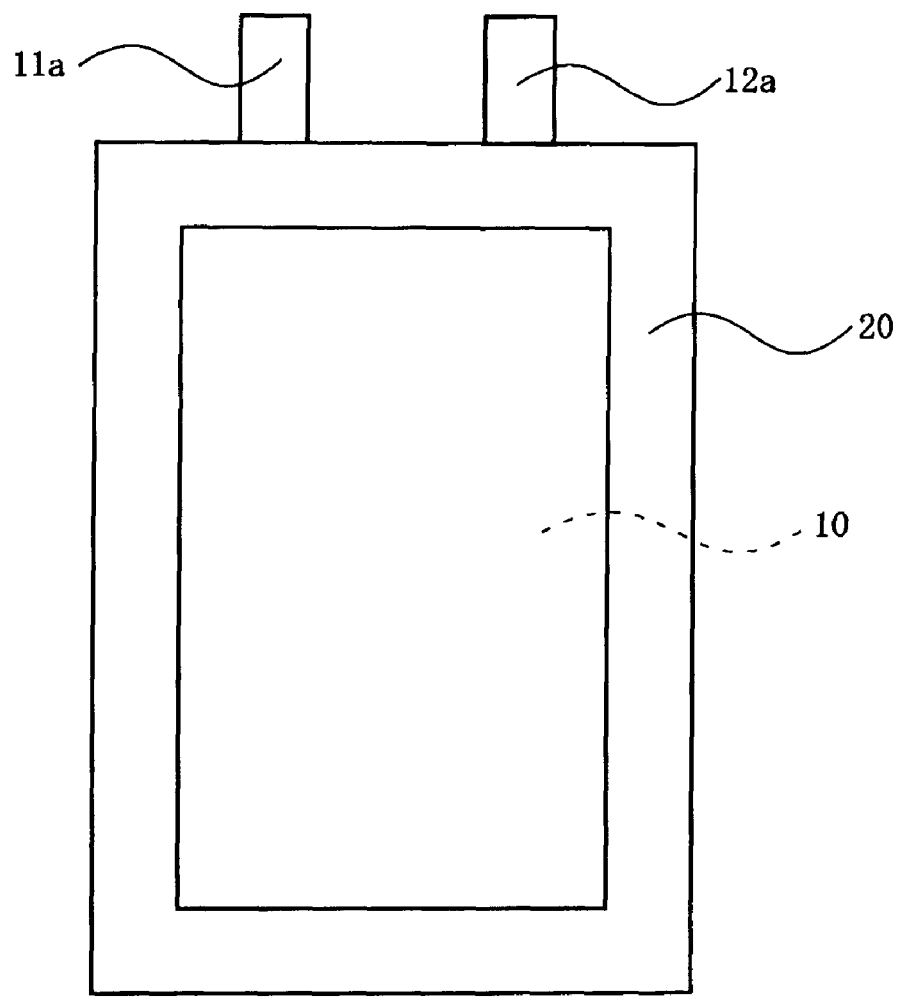
FIG. 3 is a schematic plain view illustrating a non-aqueous electrolyte secondary battery fabricated in Examples and Comparative Examples.

A battery was fabricated in the following method. As shown in FIGS. 2A and 2B, a positive electrode 11 and a negative electrode 12 fabricated as above were coiled with a separator of a fine porous made of polyethylene having lithium ion mobility interposed therebetween so that the capacity ratio of the negative electrode capacity to the positive electrode capacity was 1.05. Then, these were pressed to prepare a flat electrode 10.

Next, the flat electrode 10 was accommodated in a battery case 20 formed using aluminum laminate film, and the non-aqueous electrolyte prepared was poured into the battery case 20. Then, the open area of the battery case 20 was sealed so that a positive electrode current collector tub 11a installed on the positive electrode 11 and a negative electrode current collector tub 12a installed on the negative electrode 12 were thrust out. Thus, a non-aqueous electrolyte secondary battery having a design capacity of 780 mAh was obtained.

Example 2

In Example 2, the amount of aluminum sulfate in the aluminum sulfate aqueous solution was changed to 1.68 g in the process of preparing lithium cobalt oxide on which surface aluminum hydroxide was adhered in Example 1. Except for the above, the same procedure as in Example 1 was used to prepare a positive electrode active material wherein aluminum oxide was adhered to the surface of the positive electrode active material particle of lithium cobalt oxide. In the positive electrode active material, the adherent amount of aluminum oxide with respect to the positive electrode active material particle was 0.5 mass %.

Except for the use of the foregoing positive electrode active material, the same procedure as in Example 1 was used to fabricate a non-aqueous electrolyte secondary battery of Example 2.

Example 3

In Example 3, the amount of aluminum sulfate in the aluminum sulfate aqueous solution was changed to 0.84 g in the process of preparing lithium cobalt oxide on which surface aluminum hydroxide was adhered in Example 1. Except for the above, the same procedure as in Example 1 was used to prepare a positive electrode active material wherein aluminum oxide was adhered to the surface of the positive electrode active material particle of lithium cobalt oxide. In the positive electrode active material, the adherent amount of aluminum oxide with respect to the positive electrode active material particle was 0.25 mass %.

Except for the use of the foregoing positive electrode active material, the same procedure as in Example 1 was used to fabricate a non-aqueous electrolyte secondary battery of Example 3.

Example 4

In Example 4, the amount of aluminum sulfate in the aluminum sulfate aqueous solution was changed to 0.34 g in the process of preparing lithium cobalt oxide on which surface aluminum hydroxide was adhered in Example 1. Except for the above, the same procedure as in Example 1 was used to prepare a positive electrode active material wherein aluminum oxide was adhered to the surface of the positive electrode active material particle of lithium cobalt oxide. In the positive electrode active material, the adherent amount of aluminum oxide with respect to the positive electrode active material particle was 0.1 mass %.

Except for the use of the foregoing positive electrode active material, the same procedure as in Example 1 was used to fabricate a non-aqueous electrolyte secondary battery of Example 4.

Example 5

In Example 5, the amount of aluminum sulfate in the aluminum sulfate aqueous solution was changed to 0.10 g in the process of preparing lithium cobalt oxide on which surface aluminum hydroxide was adhered in Example 1. Except for the above, the same procedure as in Example 1 was used to prepare a positive electrode active material wherein aluminum oxide was adhered to the surface of the positive electrode active material particle of lithium cobalt oxide. In the positive electrode active material, the adherent amount of aluminum oxide with respect to the positive electrode active material particle was 0.03 mass %.

Except for the use of the foregoing positive electrode active material, the same procedure as in Example 1 was used to fabricate a non-aqueous electrolyte secondary battery of Example 5.

Example 6

In Example 6, the amount of aluminum sulfate in the aluminum sulfate aqueous solution was changed to 0.03 g in the process of preparing lithium cobalt oxide on which surface aluminum hydroxide was adhered in Example 1. Except for the above, the same procedure as in Example 1 was used to prepare a positive electrode active material wherein aluminum oxide was adhered to the surface of the positive electrode active material particle of lithium cobalt oxide. In the positive electrode active material, the adherent amount of aluminum oxide with respect to the positive electrode active material particle was 0.01 mass %.

Except for the use of the foregoing positive electrode active material, the same procedure as in Example 1 was used to fabricate a non-aqueous electrolyte secondary battery of Example 6.

In each of the positive electrode active material prepared in Examples 2 to 5, the protuberances of aluminum oxide formed in fibrous and/or flat plate were uniformly distributed and adhered to the surface of positive electrode active material particle of lithium cobalt oxide.

Comparative Example 1

In Comparative Example 1, a positive electrode active material wherein aluminum oxide was not adhered to the surface of positive electrode active material particle of lithium cobalt oxide was used in the fabrication of the positive electrode of Example 1. Except for the above, the same procedure as Example 1 was used to fabricate a non-aqueous electrolyte secondary battery of Comparative Example 1.

Comparative Example 2

In Comparative Example 2, in fabrication of the positive electrode of Example 1, a positive electrode active material wherein aluminum oxide was adhered to the surface of lithium cobalt oxide was prepared by mixing lithium cobalt oxide with aluminum oxide having a primary particle size of 30 nm (made by C. I. KASEI CO LTD.) by using a mixing machine (a tradename Nobilta made by HOSOKAWA MICRON CORPORATION). Except for the above, the same procedure as Example 1 was used to fabricate a non-aqueous electrolyte secondary battery of Comparative Example 2. The adherent amount of aluminum oxide adhering to the surface of the positive electrode active material particle of lithium cobalt oxide with respect to the positive electrode active material particle itself was 0.5 mass %.

Here, the foregoing positive electrode active material was observed by SEM. The results of observation showed that various sizes of particulate aluminum oxide were adhered with uneven distribution to the surface of lithium cobalt oxide and there existed a lot of parts where the particle of aluminum oxide was not adhered.

Next, each of the non-aqueous electrolyte secondary batteries of Examples 1 to 6 and Comparative Examples 1 and 2 was charged at a constant current of 750 mA at room temperature to 4.40 V (4.50 V with respect to lithium metal). Further, each battery was charged at a constant voltage of 4.40 V until the current became 37.5 mA. After 10 minutes pause, each battery was discharged at the constant current of 750 mA to 2.75V (initial charging/discharging), to measure initial discharge capacity Qo.

Then, each of the non-aqueous electrolyte secondary batteries of Examples 1 to 6 and Comparative Examples 1 and 2 after initial charging/discharging was charged at the constant current of 750 mA at room temperature to 4.40 V. Further, after being charged at the constant voltage of 4.40 V until the current became 37.5 mA, each non-aqueous electrolyte secondary battery was left as it is under an atmosphere of 60° C. for 5 days. After that, each battery was cooled to room temperature and was discharged at the constant current of 750 mA to 2.75 V, to measure discharge capacity Q1 after preservation.

Then, percentage (%) of capacity retention after preservation at high temperature was obtained according to the following equation. The results are shown in Table 1 below.

$$\text{Percentage (\%) of capacity retention} = (Q1/Qo) \times 100$$

Next, each of the non-aqueous electrolyte secondary batteries of which percentage of capacity retention was obtained according to the above equation was charged at the constant current of 750 mA at room temperature to 4.40 V. Further, each battery was charged at the constant voltage of 4.40 V until the current became 37.5 mA. After 10 minutes pause, each battery was discharged at the constant current of 750 mA to 2.75 V, to measure charge capacity Qa and discharge capacity Q2 at that time.

Then, each of percentage (%) of capacity recovery after preservation at high temperature and percentage (%) of charge/discharge efficiency after preservation at high temperature was obtained according to the following equations. The results are shown in Table 1 below.

$$\text{Percentage (\%) of capacity recovery} = (Q2/Qo) \times 100$$

$$\text{Percentage (\%) of charge/discharge efficiency} = (Q2/Qa) \times 100$$

Then, each of the non-aqueous electrolyte secondary batteries of Examples 1 to 6 and Comparative Examples 1 and 2 was charged at the constant current of 750 mA at room temperature to 4.40 V. Further, after being charged at the constant voltage of 4.40 V until the current became 37.5 mA, each non-aqueous electrolyte secondary battery was left as it is under the atmosphere of 60° C. for 5 days. After that, increment in thickness of each battery was measured. The results are shown in Table 1 below.

TABLE 1

| | Aluminum oxide on the surface of positive electrode active material | | Percentage of capacity retention (%) | Percentage of capacity recovery (%) | Percentage of charge/ discharge efficiency (%) | Increment of battery thickness (mm) |
|---|---|---|---|---|---|---|
| | Treatment method | Adherent amount | | | | |
| Ex. 1 | Deposition/ Heat-treatment | 1.0 mass % | 77.2 | 90.7 | 99.1 | 0.08 |
| Ex. 2 | Deposition/ Heat-treatment | 0.5 mass % | 78.4 | 89.9 | 99.0 | 0.08 |
| Ex. 3 | Deposition/ Heat-treatment | 0.25 mass % | 77.3 | 90.2 | 99.2 | 0.09 |
| Ex. 4 | Deposition/ Heat-treatment | 0.1 mass % | 76.5 | 89.8 | 99.0 | 0.08 |
| Ex. 5 | Deposition/ Heat-treatment | 0.03 mass % | 65.8 | 88.2 | 97.2 | 0.06 |
| Ex. 6 | Deposition/ Heat-treatment | 0.01 mass % | 20.2 | 85.3 | 80.1 | 0.04 |
| Comp. Ex. 1 | — | — | 9.2 | 80.4 | 74.2 | 0.03 |
| Comp. Ex. 2 | Process by machine | 0.5 mass % | 17.5 | 82.9 | 75.1 | 0.03 |

As is apparent from the results, the non-aqueous electrolyte secondary batteries of Examples 1 to 6 are more improved in the capacity retention percentage, the capacity recovery percentage, and the charge/discharge efficiency percentage after preservation at high temperature in the case of being charged to the high voltage of 4.40 V (4.50 V with respect to lithium metal) as compared with the non-aqueous electrolyte secondary batteries of Comparative Examples 1 and 2. Here, as is described above, the non-aqueous electrolyte secondary batteries of Examples 1 to 6 employed the positive electrode active material wherein the protuberances of aluminum oxide formed in fibrous and/or flat plate were uniformly distributed and adhered to the surface of positive electrode active material particle of lithium cobalt oxide, the non-aqueous electrolyte secondary battery of Comparative Example 1 employed the positive electrode active material wherein aluminum oxide was not adhered to the surface of positive electrode active material particle of lithium cobalt oxide, and the non-aqueous electrolyte secondary battery of Comparative Example 2 employed the positive electrode active material wherein aluminum oxide was adhered with uneven distribution to the surface of lithium cobalt oxide by using the machine. Particularly, the non-aqueous electrolyte secondary batteries of Examples 1 to 5 employing the positive electrode active material wherein the adherent amount of aluminum oxide adhering to the surface of the positive electrode active material particle of lithium cobalt oxide with respect to the positive electrode active material particle itself was 0.03 mass % or more show remarkable improvement in the capacity retention percentage, the capacity recovery percentage, and the charge/discharge efficiency percentage after preservation at high temperature.

This indicates that the non-aqueous electrolyte secondary batteries of Examples 1 to 6 employing the positive electrode active material wherein the protuberances of aluminum oxide formed in fibrous and/or flat plate were uniformly distributed and adhered to the surface of positive electrode active material particle of lithium cobalt oxide can attain a higher battery capacity as well as an improvement in charge/discharge cycle characteristics at high voltage and an enhancement of charge/discharge efficiency after preservation at high temperature.

Then, the non-aqueous electrolyte secondary batteries of Examples 1 to 6 and Comparative Examples 1 and 2 that were charged and discharged were disassembled, and each of the negative electrodes was observed. The results of observation showed lithium metal was not disposed on the negative electrode surface of the non-aqueous electrolyte secondary batteries of Examples 1 to 6 although deposition of lithium metal on the negative electrode surface was found in the non-aqueous electrolyte secondary batteries of Comparative Examples 1 and 2.

Example 7

In Example 7, in fabrication of the positive electrode of Example 1, aluminum hydroxide was adhered to the surface of lithium cobalt oxide as the same in Example 3. After that, heat-treatment was conducted by drying these at 120° C. for 4 hours and then fired at 300° C. under air atmosphere for 5 hours to prepare a positive electrode active material. Except for the above, the same procedure as in Example 1 was used to fabricate a non-aqueous electrolyte secondary battery of Example 7.

Example 8

In Example 8, in fabrication of the positive electrode of Example 1, aluminum hydroxide was adhered to the surface of lithium cobalt oxide as the same in Example 3. After that, heat-treatment was conducted by drying these at 120° C. for 4 hours and then fired at 250° C. under air atmosphere for 5 hours to prepare a positive electrode active material.

Thus, a non-aqueous electrolyte secondary battery of Example 8 using the foregoing positive electrode active material was fabricated in the same method as in Example 1.

Example 9

In Example 9, in fabrication of the positive electrode of Example 1, aluminum hydroxide was adhered to the surface of lithium cobalt oxide as the same in Example 3. After that, heat-treatment was conducted only by drying these at 120° C. for 4 hours without calcining, to prepare a positive electrode active material.

Thus, a non-aqueous electrolyte secondary battery of Example 9 using the foregoing positive electrode active material was fabricated in the same method as in Example 1.

Here, as shown in Examples 7 and 8, in the case that heat-treatment was conducted on aluminum hydroxide adhering to the surface of lithium cobalt oxide, by drying at 120° C. for 4 hours and then fired at 200° C. or more under air atmosphere for 5 hours, aluminum hydroxide adhering to the surface of lithium cobalt oxide was changed into aluminum oxide. In the positive electrode active material, the adherent amount of aluminum oxide adhering to the surface of the positive electrode active material particle of lithium cobalt oxide with respect to the positive electrode active material particle itself was 0.25 mass % the same as Example 3.

On the other hand, in the case that heat-treatment on aluminum hydroxide adhering to the surface of lithium cobalt oxide was only dry at 120° C. for 4 hours, the same amount of aluminum hydroxide as Example 3, 7 and 8 was adhered, however, little aluminum hydroxide was changed into aluminum oxide.

As to the non-aqueous electrolyte secondary batteries of Examples 7 to 9 fabricated, each of percentage (%) of the capacity retention after preservation at high temperature, percentage (%) of capacity recovery after preservation at high temperature and percentage (%) of charge/discharge efficiency after preservation at high temperature were obtained according to the above equations. Further, each of the non-aqueous electrolyte secondary batteries of Examples 7 to 9 was measured of increment of battery thickness after being preserved in charging conditions under atmosphere of 60° C. for 5 days. The results are shown together with that of the non-aqueous electrolyte secondary batteries of Example 3 and Comparative Example 1 in Table 2 below.

TABLE 2

| | Heat-treatment temperature of positive electrode active material | Percentage of capacity retention (%) | Percentage of capacity recovery (%) | Percentage of charge/ discharge efficiency (%) | Increment of battery thickness (mm) |
|---|---|---|---|---|---|
| Ex. 3 | 400° C. | 77.3 | 90.2 | 99.2 | 0.09 |
| Ex. 7 | 300° C. | 78.0 | 91.1 | 99.0 | 0.08 |
| Ex. 8 | 250° C. | 76.0 | 91.0 | 99.1 | 0.12 |
| Ex. 9 | 120° C. | 75.8 | 89.8 | 97.2 | 0.42 |
| Comp. Ex. 1 | — | 9.2 | 80.4 | 74.2 | 0.06 |

As is apparent from the results, as the same as Example 3, the non-aqueous electrolyte secondary batteries of Examples 7 to 9 employing the positive electrode active material wherein the protuberances of aluminum oxide and aluminum hydroxide formed in fibrous and/or flat plate were uniformly distributed and adhered to the surface of positive electrode active material particle of lithium cobalt oxide are more improved in the capacity retention percentage, the capacity recovery percentage and the charge/discharge efficiency percentage after preservation at high temperature, as compared with the non-aqueous electrolyte secondary battery of Comparative Example 1 employing the positive electrode active material wherein aluminum oxide and aluminum hydroxide were not adhered to the surface of positive electrode active material particle of lithium cobalt oxide.

As to comparison of increment of battery thickness among the non-aqueous electrolyte secondary batteries after being preserved in charging conditions under atmosphere of 60° C. for 5 days, the non-aqueous electrolyte secondary battery of Example 9 using the positive electrode wherein aluminum hydroxide was not changed into aluminum oxide shows great increase in the battery thickness, which was caused by gas generation during the preservation, as compared with each non-aqueous electrolyte secondary battery of Examples 3, 7 and 8 using the positive electrode wherein aluminum hydroxide was changed into aluminum oxide by heat-treatment at 200° C. or more.

Example 10

In Example 10, 1000 g of the foregoing lithium cobalt oxide was poured into 5 liter of ion exchange water and aluminum nitrate aqueous solution dissolving 18.4 g of aluminum nitrate nonahydrate in 100 ml of ion exchange water was further admixed thereto. Except for the above, the same procedure as in Example 1 was used to prepare a positive electrode active material particle of lithium cobalt oxide on which surface aluminum hydroxide was adhered. The adherent amount of aluminum oxide adhering to the surface of the positive electrode active material particle with respect to the positive electrode active material particle itself was 0.25 mass %, the same as Example 3.

Here, the positive electrode active material wherein aluminum oxide was adhered to the surface of lithium cobalt oxide was observed by SEM. The results of observation show that the protuberances of aluminum oxide formed in fibrous and/ or flat plate were uniformly distributed and adhered to the surface of lithium cobalt oxide the same as in Example 1.

Thus, a non-aqueous electrolyte secondary battery of Example 10 using the foregoing positive electrode active material was fabricated in the same manner as in Example 1.

As to the non-aqueous electrolyte secondary battery of Example 10 fabricated, percentage (%) of the capacity retention after preservation at high temperature, percentage (%) of capacity recovery after preservation at high temperature and percentage (%) of charge/discharge efficiency after preservation at high temperature were obtained according to the above equations. Further, the non-aqueous electrolyte secondary battery of Example 10 was measured of increment of battery thickness after being preserved in charging conditions under atmosphere of 60° C. for 5 days. The results are shown together with that of the non-aqueous electrolyte secondary batteries of Example 3 and Comparative Example 1 in Table 3 below.

TABLE 3

| | Aluminum oxide on the surface of positive electrode active material | | Percentage of capacity retention (%) | Percentage of capacity recovery (%) | Percentage of charge/ discharge efficiency (%) | Increment of battery thickness (mm) |
|---|---|---|---|---|---|---|
| | Al salt | Adherent amount | | | | |
| Ex. 10 | aluminum nitrate | 0.25 mass % | 78.0 | 91.2 | 99.2 | 0.08 |
| Ex. 3 | aluminum sulfate | 0.25 mass % | 77.3 | 90.2 | 99.2 | 0.09 |
| Comp. Ex. 1 | — | — | 9.2 | 80.4 | 74.2 | 0.03 |

As is apparent from the Table, even in the case that aluminum nitrate nonahydrate, which was not aluminum sulfate, was used as the aluminum salt for preparing the positive electrode active material particle wherein aluminum oxide was adhered to the surface of lithium cobalt oxide, it is possible to obtain the positive electrode active material particle wherein the protuberances of aluminum oxide formed in fibrous and/or flat plate were uniformly distributed and adhered to the lithium cobalt oxide surface.

Further, the same as in Example 3, the non-aqueous electrolyte secondary battery of Example 10 which employs the above-described positive electrode active material is more improved in the capacity retention percentage, the capacity recovery percentage, and the charge/discharge efficiency percentage after preservation at high temperature, as compared with the non-aqueous electrolyte secondary battery of Comparative Example 1 which employs the positive electrode active material wherein neither aluminum oxide nor aluminum hydroxide were adhered to the surface of positive electrode active material particle of lithium cobalt oxide.

Example 11

In Example 11, 2.5 g of trilithium phosphate having average particle size of 200 nm was added to 500 g of lithium cobalt oxide wherein each of Al and Mg was solved at a concentration of 1.0 mol %. Then, the mixture was admixed by the mixing machine (a tradename Nobilta made by HOSOKAWA MICRON CORPORATION) for adhesion of trilithium phosphate to the surface of lithium cobalt oxide and fired at 400° C. under air atmosphere for 6 hours.

Next, in addition to trilithium phosphate, aluminum oxide was adhered to the surface of lithium cobalt oxide as the same as Example 10. Thus, a positive electrode active material wherein trilithium phosphate and aluminum oxide were adhered to the surface of lithium cobalt oxide was obtained. With respect to the positive electrode active material particle of lithium cobalt oxide, each of the adherent amounts of aluminum oxide and trilithium phosphate, which adheres to the surface of the foregoing positive electrode active material particle, was 0.25 mass % and 0.5 mass %.

Thus, a non-aqueous electrolyte secondary battery of Example 11 using the foregoing positive electrode active material was fabricated in the same method as in Example 1.

Comparative Example 3

In Comparative Example 3, a positive electrode active material wherein only trilithium phosphate was adhered to the surface of lithium cobalt oxide wherein each of Al and Mg was solved at the concentration of 1.0 mol %, was prepared.

Thus, a non-aqueous electrolyte secondary battery of Comparative Example 3 using the foregoing positive electrode active material was fabricated in the same manner as in Example 1.

As to each of the non-aqueous electrolyte secondary batteries of Example 11 and Comparative Example 3 fabricated, percentage (%) of the capacity retention after preservation at high temperature, percentage (%) of capacity recovery after preservation at high temperature and percentage (%) of charge/discharge efficiency after preservation at high temperature were obtained according to the above equations. Further, each of the non-aqueous electrolyte secondary batteries was measured of increment of battery thickness after being preserved in charging conditions under atmosphere of 60° C. for 5 days. The results are shown together with that of the non-aqueous electrolyte secondary batteries of Example 10 and Comparative Example 1 in Table 4 below.

TABLE 4

| | Material adhering to the surface of positive electrode active material | | Percentage of capacity retention (%) | Percentage of capacity recovery (%) | Percentage of charge/ discharge efficiency (%) | Increment of battery thickness (mm) |
|---|---|---|---|---|---|---|
| | Type | Adherent amount | | | | |
| Ex. 11 | aluminum oxide | 0.25 mass % | 81.2 | 93.2 | 99.9 | 0.06 |
| | trilithium phosphate | 0.5 mass % | | | | |
| Ex. 10 | aluminum oxide | 0.25 mass % | 78.0 | 91.2 | 99.2 | 0.08 |
| Comp. Ex. 3 | trilithium phosphate | 0.5 mass % | 75.6 | 85.3 | 98.5 | 0.25 |
| Comp. Ex. 1 | — | — | 9.2 | 80.4 | 74.2 | 0.03 |

As is apparent from the results, the non-aqueous electrolyte secondary battery of Example 11 employing the positive electrode active material wherein aluminum oxide and trilithium phosphate were adhered to the surface of lithium cobalt oxide is more improved in the capacity retention percentage, the capacity recovery percentage and the charge/discharge efficiency percentage after preservation at high temperature and also restricts increments of battery thickness, as compared with the non-aqueous electrolyte secondary battery of Example 10.

In contrast, although the non-aqueous electrolyte secondary battery of Comparative Example 3 employing the positive electrode active material wherein only trilithium phosphate was adhered to the surface of lithium cobalt oxide is improved to some extent in the capacity retention percentage, the capacity recovery percentage and the charge/discharge efficiency percentage after preservation at high temperature as compared with the non-aqueous electrolyte secondary battery of Comparative Example 1, the rates of these improvements are low as compared with the non-aqueous electrolyte secondary batteries of Examples 10 and 11. Moreover, the non-aqueous electrolyte secondary battery of Comparative Example 3 shows greater increment in battery thickness as compared with the non-aqueous electrolyte secondary batteries of Examples 10 and 11 and Comparative Example 1. This is thought to be because the use of the positive electrode active material wherein only trilithium phosphate was adhered to the surface of lithium cobalt oxide is hardly attain a sufficient restriction of the reaction between the positive electrode active material and the non-aqueous electrolyte during preservation at high temperature.

Example 1A

In Example 1A, although the same positive electrode active material as that of Example 1 was used and the capacity ratio of the negative electrode capacity to the positive electrode capacity was 1.05, the amount of the positive electrode active material in the positive electrode was changed so that the design capacity of the battery in the case that the charging voltage was 4.37 V (4.47 V with respect to lithium metal) was 780 mAh.

Comparative Example 1a

In Comparative Example 1a, although the same positive electrode active material as that of Comparative Example 1 was used and the capacity ratio of the negative electrode capacity to the positive electrode capacity was 1.05, the amount of the positive electrode active material in the positive electrode was changed so that the design capacity of the battery in the case that the charging voltage was 4.37 V (4.47 V with respect to lithium metal) was 780 mAh.

Example 1B

In Example 1B, although the same positive electrode active material as that of Example 1 was used and the capacity ratio of the negative electrode capacity to the positive electrode capacity was 1.05, the amount of the positive electrode active material in the positive electrode was changed so that the design capacity of the battery in the case that the charging voltage was 4.33 V (4.43 V with respect to lithium metal) was 780 mAh.

Comparative Example 1b

In Comparative Example 1b, although the same positive electrode active material as that of Comparative Example 1 was used and the capacity ratio of the negative electrode capacity to the positive electrode capacity was 1.05, the amount of the positive electrode active material in the positive electrode was changed so that the design capacity of the battery in the case that the charging voltage was 4.33 V (4.43 V with respect to lithium metal) was 780 mAh.

Example 1C

In Example 1C, although the same positive electrode active material as that of Example 1 was used and the capacity ratio of the negative electrode capacity to the positive electrode capacity was 1.05, the amount of the positive electrode active material in the positive electrode was changed so that the design capacity of the battery in the case that the charging voltage was 4.30 V (4.40 V with respect to lithium metal) was 780 mAh.

Comparative Example 1C

In Comparative Example 1c, although the same positive electrode active material as that of Comparative Example 1 was used and the capacity ratio of the negative electrode capacity to the positive electrode capacity was 1.05, the amount of the positive electrode active material in the positive electrode was changed so that the design capacity of the battery in the case that the charging voltage was 4.30 V (4.40 V with respect to lithium metal) was 780 mAh.

Example 1D

In Example 1D, although the same positive electrode active material as that of Example 1 was used and the capacity ratio of the negative electrode capacity to the positive electrode capacity was 1.05, the amount of the positive electrode active material in the positive electrode was changed so that the design capacity of the battery in the case that the charging voltage was 4.25 V (4.35 V with respect to lithium metal) was 780 mAh.

Comparative Example 1D

In Comparative Example 1d, although the same positive electrode active material as that of Comparative Example 1 was used and the capacity ratio of the negative electrode capacity to the positive electrode capacity was 1.05, the amount of the positive electrode active material in the positive electrode was changed so that the design capacity of the battery in the case that the charging voltage was 4.25 V (4.35 V with respect to lithium metal) was 780 mAh.

Example 1E

In Example 1E, although the same positive electrode active material as that of Example 1 was used and the capacity ratio of the negative electrode capacity to the positive electrode capacity was 1.05, the amount of the positive electrode active material in the positive electrode was changed so that the design capacity of the battery in the case that the charging voltage was 4.20 V (4.30 V with respect to lithium metal) was 780 mAh.

Comparative Example 1E

In Comparative Example 1e, although the same positive electrode active material as that of Comparative Example 1 was used and the capacity ratio of the negative electrode capacity to the positive electrode capacity was 1.05, the amount of the positive electrode active material in the positive electrode was changed so that the design capacity of the battery in the case that the charging voltage was 4.20 V (4.30 V with respect to lithium metal) was 780 mAh.

After the non-aqueous electrolyte secondary batteries of Example 1, Comparative Examples 1 and 2, Examples 1A to 1E and Comparative Examples 1a to 1e were fabricated as described above, each of the batteries was charged at a constant current of 750 mA at room temperature until each of the battery voltage reached the above specified rate and further charged at each of the constant voltage until the current reduced to 37.5 mA. Then, after 10 minutes pause, each of the batteries was discharged at the constant current of 750 mA until the voltage became 2.75 V, in order to measure initial discharge capacity Qo. Further, as to each of the non-aqueous electrolyte secondary batteries of Example 1, Comparative Examples 1 and 2, Examples 1A to 1E and Comparative Examples 1a to 1e, the positive electrode active material capacity per 1 g of the positive electrode active material (mAh/g) was measured. The results are shown in Table 5 below.

Next, each of the non-aqueous electrolyte secondary batteries after initial charging/discharging was charged at the constant current of 750 mA until the above-specified voltage in the condition of being preserved in a thermostatic container at 60° C. Further, each of the batteries was subjected to a high-temperature sequence charging examination in which each of the batteries was charged for 3 days so that each constant voltage was maintained. Then, increment of battery thickness of the non-aqueous electrolyte secondary batteries after the high-temperature sequence charging examination against before the high-temperature sequence charging examination was measured. The results are shown in Table 5 below.

Also, each of the non-aqueous electrolyte secondary batteries was discharged at the constant current of 750 mA at room temperature until the voltage became 2.75 V, in order to measure discharge capacity Q1 after the high-temperature sequence charging examination. After that, 10 minutes pause was made.

Then, percentage (%) of capacity retention after the high-temperature sequence charging examination was obtained according to the following equation. The results are shown in Table 5 below.

Percentage (%) of capacity retention=$(Q1/Qo) \times 100$

Next, each of the non-aqueous electrolyte secondary batteries after 10 minutes pause was charged at the constant current of 750 mA at room temperature to the above specified voltage. Further, each battery was charged at the constant voltage until the current became 37.5 mA. After 10 minutes pause, each battery was discharged at the constant current of 750 mA until the battery became 2.75V, to measure charge capacity Qa and discharge capacity Q2 at that time.

Then, each of percentage (%) of capacity recovery after the high-temperature sequence charging examination and percentage (%) of charge/discharge efficiency after the high-temperature sequence charging examination was obtained according to the following equations. The results are shown in Table 5 below.

Percentage (%) of capacity recovery=$(Q2/Qo) \times 100$

Percentage (%) of charge/discharge efficiency=$(Q2/Qa) \times 100$

TABLE 5

| | Charging voltage (V) | Positive electrode active material capacity (mAh/g) | Percentage of capacity retention (%) | Percentage of capacity recovery (%) | Percentage of charge/ discharge efficiency (%) | Increment of battery thickness (mm) |
|---|---|---|---|---|---|---|
| Ex. 1 | 4.40 | 189 | 85.2 | 76.5 | 99.0 | 1.85 |
| Comp. Ex. 1 | 4.40 | 189 | 61.2 | 66.5 | 84.2 | 6.52 |
| Comp. Ex. 2 | 4.40 | 189 | 62.5 | 67.8 | 84.6 | 6.38 |
| Ex. 1A | 4.37 | 184 | 90.2 | 90.0 | 99.8 | 0.95 |
| Comp. Ex. 1a | 4.37 | 184 | 71.2 | 77.0 | 87.5 | 2.51 |
| Ex. 1B | 4.33 | 177 | 95.0 | 95.0 | 100 | 0.28 |
| Comp. Ex. 1b | 4.33 | 177 | 93.4 | 93.1 | 90.0 | 0.55 |
| Ex. 1C | 4.30 | 170 | 97.5 | 97.6 | 100 | 0.25 |
| Comp. Ex. 1c | 4.30 | 170 | 94.5 | 95.5 | 92.2 | 0.43 |
| Ex. 1D | 4.25 | 161 | 99.5 | 99.0 | 99.8 | 0.15 |
| Comp. Ex. 1d | 4.25 | 161 | 97.3 | 98.5 | 98.5 | 0.19 |
| Ex. 1E | 4.20 | 154 | 99.5 | 99.2 | 99.9 | 0.03 |
| Comp. Ex. 1e | 4.20 | 154 | 98.5 | 98.1 | 99.2 | 0.08 |

As is apparent from the results, as the charging voltage becomes high, the positive electrode active material capacity per 1 g of the positive electrode active material (mAh/g) is increased; consequently, a non-aqueous electrolyte secondary battery with high capacity can be obtained.

Among the non-aqueous electrolyte secondary batteries of Example 1, Comparative Examples 1 and 2, Examples 1A to 1E and Comparative Examples 1a to 1e, the non-aqueous electrolyte secondary batteries of which charging voltage was the same are compared with each other. The results of comparison were the following.

The non-aqueous electrolyte secondary batteries of Examples 1 and 1A to 1E show smaller increment in the battery thickness after the high-temperature sequence charging examination and improved capacity retention percentage, capacity recovery percentage and charge/discharge efficiency percentage after the high-temperature sequence charging examination, as compared with the non-aqueous electrolyte secondary battery of Comparative Examples 1, 1a to 1e and 2. Here, as described above, the non-aqueous electrolyte secondary batteries of Examples 1 and 1A to 1E employed the positive electrode active material wherein the protuberances of aluminum oxide formed in fibrous and/or flat plate were uniformly distributed and adhered to the surface of positive electrode active material particle of lithium cobalt oxide, the non-aqueous electrolyte secondary batteries of Comparative Examples 1 and 1a to 1e employed the positive electrode active material wherein aluminum oxide was not adhered to the surface of positive electrode active material particle of lithium cobalt oxide, and the non-aqueous electrolyte secondary battery of Comparative Example 2 employed the positive electrode active material wherein the aluminum oxide was mechanically adhered being unevenly distributed to the surface of positive electrode active material particle of lithium cobalt oxide.

Particularly, according to the results of comparison among the non-aqueous electrolyte secondary batteries of which charging voltage was 4.30 V (4.40 V with respect to lithium metal) or more, the non-aqueous electrolyte secondary batteries of Comparative Examples 1, 1a to 1c and 2 show great decrease in charge/discharge efficiency. On the other hand, the non-aqueous electrolyte secondary batteries of Examples 1 and 1A to 1C do not show such a decrease.

In addition, according to the results of comparison among the non-aqueous electrolyte secondary batteries of which charging voltage was 4.37 V (4.47 V with respect to lithium metal) or more, the non-aqueous electrolyte secondary batteries of Comparative Examples 1, 1a and 2 show sharp increment of the battery thickness. In contrast, the non-aqueous electrolyte secondary batteries of Examples 1 and 1A restrict increment of the battery thickness. Particularly, among the non-aqueous electrolyte secondary batteries of which charging voltage was 4.40 V (4.50 V with respect to lithium metal), the non-aqueous electrolyte secondary battery of Example 1 shows remarkably small increment of the battery thickness as compared with the non-aqueous electrolyte secondary batteries of Comparative Examples 1 and 2.

Example 12

In Example 12, 1000 g of the foregoing lithium cobalt oxide was poured into 5 liter of ion exchange water and aluminum sulfate aqueous solution dissolving 3.36 g of aluminum sulfate in 100 ml of ion exchange water was admixed thereto. Further, sodium oxide was added to the resultant mixture to adjust pH thereof to be 9.0. Except for the above, the same procedure as in Example 1 was used to prepare a positive electrode active material wherein the adherent amount of aluminum oxide adhering to the surface of the positive electrode active material particle of lithium cobalt oxide with respect to the positive electrode active material particle itself was 0.5 mass %.

Thus, a non-aqueous electrolyte secondary battery of Example 12 using the foregoing positive electrode active material was fabricated in the same manner as in Example 1.

Example 13

In Example 13, 1000 g of the foregoing lithium cobalt oxide was poured into 5 liter of ion exchange water and aluminum sulfate aqueous solution dissolving 3.36 g of aluminum sulfate in 100 ml of ion exchange water was admixed thereto. Further, sodium oxide was added to the resultant mixture to adjust the pH to be 8.0. Except for the above, the same procedure as in Example 1 was used to prepare a positive electrode active material wherein the adherent amount of aluminum oxide adhering to the surface of the positive electrode active material particle of lithium cobalt oxide with respect to the positive electrode active material particle itself was 0.5 mass %.

Thus, a non-aqueous electrolyte secondary battery of Example 13 using the foregoing positive electrode active material was fabricated in the same manner as in Example 1.

Here, each of the positive electrode active material prepared in Examples 12 and 13 was observed by SEM. The results of observation show that the finer protuberances of aluminum oxide formed in fibrous and/or flat plate were more uniformly distributed and adhered to the surface of lithium cobalt oxide as compared with that of Example 1.

Further, as the same as the non-aqueous electrolyte secondary batteries of Example 1 and Comparative Example 1, each of the non-aqueous electrolyte secondary batteries of Examples 12 and 13 was charged until each of the battery voltage reached 4.40 V (4.50 V with respect to lithium metal), to measure increment of battery thickness after the high-temperature sequence charging examination as well as percentage (%) of capacity retention after the high-temperature sequence charging-examination, percentage (%) of capacity recovery after the high-temperature sequence charging-examination and percentage (%) of charge/discharge efficiency after the high-temperature sequence charging examination. The results are shown together with that of the non-aqueous electrolyte secondary batteries of Example 1 and Comparative Example 1 in Table 6 below.

TABLE 6

| | pH at the time of treatment | Charging voltage (V) | Percentage of capacity retention (%) | Percentage of capacity recovery (%) | Percentage of charge/ discharge efficiency (%) | Increment of battery thickness (mm) |
|---|---|---|---|---|---|---|
| Ex. 12 | 9.0 | 4.40 | 87.5 | 78.7 | 99.8 | 1.49 |
| Ex. 13 | 8.0 | 4.40 | 87.7 | 77.9 | 99.9 | 1.35 |
| Ex. 1 | 10.3 | 4.40 | 85.2 | 76.5 | 99.0 | 1.85 |
| Comp. Ex. 1 | — | 4.40 | 61.2 | 66.5 | 84.2 | 6.52 |

As is apparent from the results, the non-aqueous electrolyte secondary batteries of Examples 12 and 13 show much smaller increment of the battery thickness after the high-temperature sequence charging examination and furthermore improved capacity retention percentage, capacity recovery percentage and charge/discharge efficiency percentage after the high-temperature sequence charging examination, as compared with the non-aqueous electrolyte secondary battery of Example 1.

It is considered that the above effects can be obtained, because, as compared with that of Example 1, the finer protuberances of aluminum oxide formed in fibrous and/or flat plate were more uniformly distributed and adhered to the surface of lithium cobalt oxide in the positive electrode active material of Examples 12 and 13.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

The invention claimed is:

1. A positive electrode active material for non-aqueous electrolyte secondary battery,
    wherein oxide containing Al and/or hydroxide containing Al having protruding-shape is uniformly distributed and adhered to the surface of a positive electrode active material particle;
    wherein said oxide containing Al and/or hydroxide containing Al being made to have a protruding-shape after being adhered to the surface of the positive electrode active material;
    wherein an adherent amount of oxide containing Al and/or hydroxide containing Al with respect to the positive electrode active material particle is 0.03 mass % or more;
    wherein said oxide containing Al and/or hydroxide containing Al having the protruding-shape is formed in fibrous and/or flat plate; and
    wherein the protruding-shape formed in fibrous and/or flat plate is adhered vertically on the surface of positive electrode active material particle.

2. The positive electrode active material for non-aqueous electrolyte secondary battery as claimed in claim 1,
    wherein a material which is uniformly distributed and adhered to the surface of the positive electrode active material particle is oxide containing Al having the protruding-shape.

3. The positive electrode active material for non-aqueous electrolyte secondary battery according to claim 1,
    wherein phosphoric acid composite is also adhered to the surface of the positive electrode active material particle.

4. The positive electrode active material for non-aqueous electrolyte secondary battery according to claim 1,
    wherein phosphoric acid composite is trilithium phosphate.

5. A process for preparing a positive electrode active material for non-aqueous electrolyte secondary battery comprising the steps of:
    depositing hydroxide containing Al on the surface of a positive electrode active material particle in an aqueous solution dissolving Al salt;
    and heat-treating the positive electrode active material particle on which hydroxide containing Al is deposited.

6. The process for preparing the positive electrode active material for non-aqueous electrolyte secondary battery as claimed in claim 5,
    wherein pH of the aqueous solution dissolving Al salt is adjusted to be within the range of 7 to 11 in the case of deposition of hydroxide containing Al on the surface of the positive electrode active material particle.

7. The process for preparing the positive electrode active material for non-aqueous electrolyte secondary battery as claimed in claim 5,
    wherein the pH of the aqueous solution dissolving Al salt is adjusted to be within the range of 7 to 9 in the case of deposition of hydroxide containing Al on the surface of the positive electrode active material particle.

8. The process for preparing the positive electrode active material for non-aqueous electrolyte secondary battery as claimed in claim 5,
    wherein temperature of heat-treating the positive electrode active material particle on which hydroxide containing Al is deposited is 200° C. or more.

9. A positive electrode for non-aqueous electrolyte secondary battery,
    wherein the positive electrode active material for non-aqueous electrolyte secondary battery according to claim 1 is employed as a positive electrode active material.

10. A non-aqueous electrolyte secondary battery comprising a positive electrode, a negative electrode, and a non-aqueous electrolyte, wherein the positive electrode for non-aqueous electrolyte secondary battery according to claim 9 is utilized as the positive electrode.

11. The non-aqueous electrolyte secondary battery as claimed in claim 10, wherein the positive electrode is charged to 4.40 V or more with respect to lithium metal.

12. The non-aqueous electrolyte secondary battery as claimed in claim 10, wherein the positive electrode is charged to 4.43 V or more with respect to lithium metal.

13. The non-aqueous electrolyte secondary battery as claimed in claim 10, wherein the positive electrode is charged to 4.47 V or more with respect to lithium metal.

14. The non-aqueous electrolyte secondary battery as claimed in claim 10 which may be used under environments of 50° C. or more.

* * * * *